(12) United States Patent
Ellison

(10) Patent No.: US 6,399,193 B1
(45) Date of Patent: Jun. 4, 2002

(54) SURFACING LAMINATE WITH BONDED WITH PIGMENTED PRESSURE SENSITIVE ADHESIVE

(75) Inventor: Thomas McKnight Ellison, Fort Mill, SC (US)

(73) Assignee: The University of Massachusetts Lowell, Lowell, MA (US)

( * ) Notice: Subject to any disclaimer, the term of this patent is extended or adjusted under 35 U.S.C. 154(b) by 0 days.

(21) Appl. No.: 09/432,827

(22) Filed: Nov. 5, 1999

Related U.S. Application Data

(60) Provisional application No. 60/112,713, filed on Dec. 18, 1998.

(51) Int. Cl.⁷ .............................. B32B 7/12; C09J 7/02
(52) U.S. Cl. .................... 428/354; 428/41.2; 428/41.6; 428/42.1; 428/343
(58) Field of Search .................... 428/40.1, 41.2, 428/41.6, 42.1, 343, 354

(56) References Cited

U.S. PATENT DOCUMENTS

| | | |
|---|---|---|
| 4,199,489 A | 4/1980 | Short |
| 4,769,100 A | 9/1988 | Short et al. |
| 4,810,540 A | 3/1989 | Ellison et al. |
| 4,818,589 A | 4/1989 | Johnson et al. |
| 4,824,506 A | 4/1989 | Hoerner et al. |
| 4,913,760 A | 4/1990 | Benson et al. |
| 4,931,324 A | 6/1990 | Ellison et al. |
| 4,943,680 A | 7/1990 | Ellison et al. |
| 5,114,789 A | 5/1992 | Reafler |
| 5,215,826 A | 6/1993 | Shimanski et al. |
| 5,518,786 A | 5/1996 | Johnson et al. |
| 6,042,678 A * | 3/2000 | Johnson et al. ............. 156/246 |
| 6,103,328 A * | 8/2000 | Niazy ........................ 428/40.1 |

FOREIGN PATENT DOCUMENTS

| | | |
|---|---|---|
| EP | 0285071 | 10/1988 |
| WO | WO9403337 | 2/1994 |
| WO | WO9640480 | 12/1996 |
| WO | WO9640519 | 12/1996 |

* cited by examiner

*Primary Examiner*—Daniel Zirker
(74) *Attorney, Agent, or Firm*—Bachman & LaPointe, P.C.

(57) ABSTRACT

A paint film particularly for servicing an automobile body part including: a clear coat layer of a sheet of polymer, said sheet having chemical resistance, weatherability and optical clarity, said sheet having an outer surface and an opposed bonding surface; a color layer adhered to said bonding surface, said color layer, said color layer including an adhesive and at least one color pigment; and a support layer of an extruded film adhered to said color layer.

22 Claims, 1 Drawing Sheet

SURFACING LAMINATE WITH BONDED WITH PIGMENTED PRESSURE SENSITIVE ADHESIVE

CROSS-REFERENCE TO RELATED APPLICATION

This application claims the benefit of U.S. Provisional Application Ser. No. 60/112,713, filed Dec. 18, 1998.

FIELD OF THE INVENTION

This invention relates to laminated sheet materials useful in providing decorative and/or functional surfaces to plastic and metal panels for automobiles and the like without the emission of polluting solvents.

BACKGROUND OF THE INVENTION

Exterior appearance is one of the most critical features in the sale of automobiles. Primary contributors to appearance are shape and finish. The finish on an automobile provides for durability against the exterior environment and the color and appearance attributes of texture, gloss, wet-look, distinctness-of-image, flop and color. Historically, finishes have been applied to automobiles by spray coating a solvent borne resin containing pigments and flakes. The process is highly polluting and costly. The industry has attempted to reduce pollution by replacing the solvent in part with water. While reducing pollutants, pollution is not eliminated and these so called waterborne paints present adhesion problems for certain substrates. More recently, attempts have been made to totally eliminate solvent emissions by the use of "paint" films and film laminates. These film finishes are produced in a controlled process in which any solvents used in manufacture are readily collected for efficient incineration. The "dry" films are then formed, molded and bonded to substrates to complete the finishing process in a solvent free process.

The references set out below are germane to the foregoing. U.S. Pat. No. 4,199,489 to Short, issued Apr. 22, 1980. U.S. Pat. No. 4,824,506 to Hoerner et al., issued Apr. 25, 1989. U.S. Pat. 4,769,100 to Short et al., issued Sep. 6, 1988. U.S. Pat. No. 4,818,589 to Johnson et al., issued Apr. 4, 1989. PCT Publication No. WO94/03337 to Duhme et al., published Feb. 17, 1994. U.S. Pat. No. 4,810,540 to Ellison et al., issued Mar. 7, 1989. U.S. Pat. No. 4,931,324 to Ellison et al., issued Jun. 5, 1990. U.S. Pat. No. 4,943,608 to Ellison et al., issued Jun. 24, 1990. U.S. Pat. No. 5,215,826 to Shimanski et al., issued Jun. 1, 1993. U.S. Pat. No. 4,913,760 to Benson et al., issued Apr. 3, 1990. U.S. Pat. No. 5,114,789 to Reafler, issued May 19, 1992. U.S. Pat. No. 5,518,786 to Johnson et al., issued May 21, 1996. European Patent Application 0,285,071 to Spain et al., published Oct. 5, 1988. PCT Publication No. WO96/40480 to Enlow et al., published Dec. 19, 1996. PCT Publication No. WO96/40519 to Enlow et al., published Dec. 19, 1996.

In general, film finishes consist of a clear coat layer, a color layer, an adhesive, a support layer and, optionally, an adhesive layer. While film finishes do eliminate solvents from the assembly plant, they are relatively complicated and expensive to manufacture. One related development in the aforesaid U.S. Pat. No. 5,518,786 reports a Class A film finish suitable for hand application as practiced with hand applied decals and racing stripes. The installed finish consists of:

| LAYER | THICKNESS (inches) |
|---|---|
| Clear Coat | 0.0008 to 0.0014 |
| Tie Coat | 0.0001 to 0.0004 |
| Base (color) Coat | 0.0015 to 0.0035 |
| Pressure Sensitive Adh. | 0.001 to 0.0015 |

Constructions similar to this are used to surface molded plastic. In these constructions the clear coat, optionally the tie coat and the base coat are common. The pressure sensitive adhesive is replaced with a structural adhesive, either heat-activated thermoplastic or crosslinking, which is bonded to a support film or sheet.

What is needed is a way to retain the desirable appearance, weathering and environmental attributes of the present film finishes while reducing the cost of manufacture.

SUMMARY OF THE INVENTION

In accordance with the present invention, the cost of manufacturing film finishes is reduced by incorporating the base (color) coat into an adhesive, desirably a pressure sensitive adhesive which serves as the bonding medium between the clear coat and the support film or sheet. The resulting construction consists of three [A, B, C] essential "major" layers. The major layers provide the basic appearance, color, durability and bonding attributes required for a Class A automotive finish. Other finish appearances are possible to meet differing design requirements. "Minor" layers [d, e, f, . . . ] may be incorporated to add additional features or enhancements without detracting from the fundamental manufacturing efficiency of the three major layers. The construction profile is:

A/B/C

Each layer will be discussed individually. The optional minor layers may be used individually, in multiple or in total. A preferred construction profile including the potential location of minor layers is:

d/A/e/B/f/C/g

In one embodiment consisting of three major layers, clear coat layer A is a polyvinylidenefluoride (PVDF) polymer or copolymer. The base coat layer B is desirably a permanent type acrylic pressure sensitive adhesive which has been pigmented with pigments and flakes to match the desired color. The support layer C is desirably an extruded film (4 to 10 mils thick) or sheet (11 to 40 mils thick) of a thermoplastic olefin, TPO.

Thus, the present invention relates to a composite decorative sheet consisting of three major layers in which the first, layer A-clear coat, and third, layer C-film, are laminated with an intermediate pigmented pressure-sensitive adhesive, layer B-pigmented adhesive. The composite is characterized as having the appearance and weatherability of a high quality base coat/clear coat paint and said composite having the requisite formability to be shaped into diverse three dimension surfaces.

Other features of the present invention will appear hereinbelow.

DETAILED DESCRIPTION OF PREFERRED EMBODIMENTS

Figure 1:
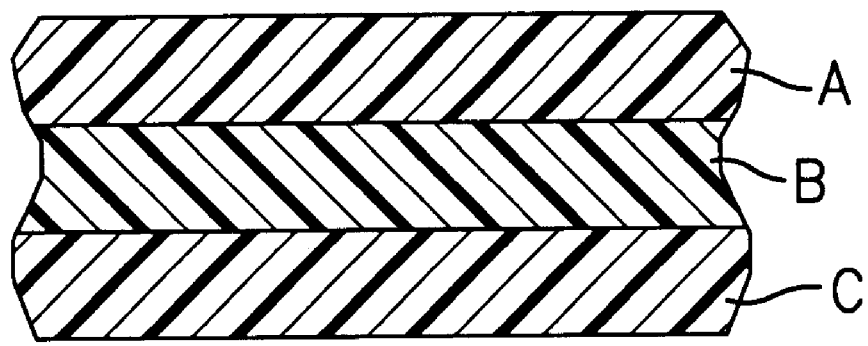
FIG. 1 is a schematic view of the construction of the present invention.

A cost effective film finish is made by laminating a clear coat to a support film with a pigmented pressure sensitive adhesive. A pressure sensitive adhesive is defined by the Pressure Sensitive Tape Counsel, 1201 Waukegan Rd., Glenview, Ill. 60025 "Test Methods for Pressure Sensitive Tapes" as follows:

"Pressure-Sensitive—A term commonly used to designate a distinct category of adhesive tapes and adhesives which in dry (solvent free) form are aggressively and permanently tacky at room temperature and firmly adhere to a variety of dissimilar surfaces upon mere contact without the need for more than finger or hand pressure. They require no activation by water, solvent or heat in order to exert a strong adhesive holding force toward such materials as paper, plastic, glass, wood, cement and metals. They have a sufficiently cohesive holding and elastic nature so that, despite their aggressive tackiness, they can be handled with the fingers and removed from smooth surfaces without leaving a residue. General trade usage by leading tape manufacturers does not sanction extension of the term "pressure-sensitive" to embrace tapes and adhesives merely because they are sticky (e.g. fly-papers), or merely because they adhere or cohere to a particular type of surface (e.g. self-adhesive envelopes); and terms other than "pressure-sensitive" should be used in such cases to avoid confusion."

The feature of bonding to dissimilar surfaces is important to this invention where one adhesive is used to bond a modified fluoropolymer to an olefin, both materials known to be difficult to bond. The feature further provides for other support films to be used without redesigning the color/adhesive function. Thus two different support films such as a thermoplastic olefin (TPO) and acrylonitrile/butadiene/styrene (ABS) may be used to surface adjacent parts and yet the surface appearance and performance properties remain the same. Manufacturing efficiency is gained in that ⅔'s of the film construction can be constant while changing only the C or extruded film support layer for various applications. Conversely, a common base coat-film (B/C) combination may be combined with several clear coat or A layers without regard for adhesion primers or extra adhesive layers. The pressure-sensitive adhesives used in this invention are typically self-curing, permanent type acrylic based adhesives developed by a number of manufacturers for the exterior sign, graphics and automotive markets.

Pressure-sensitive adhesives are usually thought of in hand application, often with self-wound tapes where the tape may be removed without leaving an adhesive residue. In the automotive industry, pressure-sensitive adhesives are used to permanently mount decal films and contrasting paint appearing films to the exterior body paint for enhanced style. One such application is described in the aforesaid U.S. Pat. No. 5,518,786. While hand applied, the adhesive bond in these applications builds to be film destruction on removal, in many applications. The lamination bonding process described in this invention provides for improved performance of the pressure-sensitive adhesive. The A and C layers are typically machine laminated with adhesive layer B after layer B is dried to remove solvent. The machine process allows for increased and more uniform bonding pressure over hand application. Furthermore, lamination typically occurs while the adhesive is continuing to undergo self cure. Wet-out, a condition for good adhesion, of the A and C surfaces is enhanced by the under cured adhesive resulting in higher bonds after cure than would be expected in typical hand application. Hand applied adhesives are limited in their ability to be cross linked or cured by the need to retain sufficient tack at the point of application, usually days or months after manufacture. This restraint does not apply to lamination of layer A to layer C. The cross-linking feature of a pressure-sensitive adhesive may be increased in the lamination process while maintaining sufficient tack level required for wet-out and bonding. This results in a higher cohesive bond strength and a firmer bond layer. Both features improve field performance. Bonding may be further enhanced by applying heat from a laminating roll in the lamination process. However the pressure-sensitive adhesive is processed, ideally, the cohesive strength of the pressure-sensitive adhesive will be greater than the tensile strength of the A layer, preventing failure by the A layer, self-delaminating or intentional peeling by vandals.

Layer A; Clear Coat

The clear coat provides the first line of defense for environmental attack by ultraviolet rays (UV) from the sun, etching from acid rain, chipping from stones, marring, gouging, abrasion, staining and discoloration from dirt pick-up, organic growth, road tar or other deleterious materials that come in contact with automobile exteriors. The clear coat is desirably a cast or an extruded sheet of polymer having chemical resistance, weatherability and optical clarity. Accordingly, layer A is formulated from materials that will resist these exposures. Additionally, the clear coat provides the surface gloss, and, in combination with a smooth layer B, the distinctness of image or the overall glossy, "wet look" associated with high quality Class A base coat/clear coat automotive paints. A description of preferred clear coats and methods of manufacture is disclosed in the aforesaid U.S. Pat. Nos. 4,810,540; 4,931,324 and 5,518,786, the disclosure of which is incorporated herein by reference. The clear coats described in the referenced patents are made by casting a PVDF polymer, copolymer or blend, as a PVDF/acrylic blend, from solvent onto a smooth carrier web such as a continuous steel belt or smooth grades of polyester film or smooth casting paper. The PVDF/acrylic composition has added UV screeners to protect the pigments and resins present in the B and C layers.

Alternatively, the clear layer may be a cast polyvinyl fluoride (PVF) on a polyethylene terephthalate (PET) carrier. A further option is to manufacture the clear coat by extrusion coating as described in the aforesaid PCT Publications WO 96/40519 and WO 96/40480, the disclosures of which are incorporated herein by reference. In one embodiment of this invention, a PVDF/acrylic composition is extruded and blown into film form. Blown film is known as an efficient manufacturing process. The Fluoropolymer compositions cited in the referenced patents provide for outstanding weathering and acid rain resistance but may be over designed for certain applications. Accordingly films of intermediate performance such as an all acrylic polymer film, weatherable formable grades of PET film, Surlyn UV resistant grade ionomer and polycarbonate films may be used in this invention. In less demanding applications, clear polyvinyl chloride (PVC) films and enhanced grades of polyolefins may be used.

It is anticipated that layer A may be stratified in the manufacturing process to yield a first surface with certain desirable feature(s) and a second surface with other desirable feature(s); for example, a PVDF/acrylic composition may be cast in layers or extruded in layers to yield a PVDF rich first surface for improved weathering and stain resistance and an acrylic rich second surface for reduced cost and improved bonding.

The second surface of the films described above may be corona treated as routinely practiced in film converting to improve adhesive wet-out and adhesion of layer B. The thickness of layer A should be between 0.0005 and 0.01 inch and preferably between 0.006 inch and 0.001 inch with 0.002 inch typical.

Layer B Base (color) Coat

The color layer includes an adhesive intimately admixed with at least one colorant. A number of exterior grade, permanent type acrylic pressure-sensitive adhesives are desirable and are readily available. The adhesives preferred for use in this invention are water clear and self crosslinking. Slight tinting or coloration can be tolerated if not objectionable in the final pigmented form. A further requirement for the adhesive is that it must be capable of being pigmented to color with colorants, such as color pigments, dies, flakes and the like that are typically used in the automotive exterior paint industry while maintaining desired bonding performance. The cohesive strength of the adhesive may be increased by adding additional reactive cross linking compounds; for example, pressure sensitive adhesives may be formulated to have COOH, OH, epoxy, or other functionality for which cross linking compounds such as polyisocyanates and melamines are known by those skilled in the art. A number of adhesive grades including the following meet these criteria: Morton 607, Morton 649, Monsanto 2480, Monsanto 2539, Ashland 1810 and Ashland 1920. Layer B thickness is desirably from 0.0008 to 0.0005 inch and preferably 0.002 inch.

Pigments may be added to the adhesive by first dispersing the pigment into a portion of the pressure-sensitive adhesive itself by techniques known in the pigment dispersing industry. Alternatively, pigments dispersed in acrylic dispersing resins as used in the paint industry may be used. Either process may be used without preference. Metal, mica and so-called interference coated flakes are typically stirred directly into the pressure-sensitive adhesive. UV screeners and HALs stabilizers may be added to enhance weathering performance in addition to the screening provided by layer A. Pigment loading is sufficient to provide opacity and to meet color and appearance criteria. Excess pigment loading is avoided to minimize any detrimental effect on bond performance. Final composition is tested together with layers A and C to insure overall system integrity.

In production, the pigmented adhesive may be applied in several ways. In one preferred embodiment, the adhesive is coated by known coating methods such as slot die, reverse roll, knife over roll, rotary screen or other means to yield a smooth uniform coating, free from streaks or other objectionable defects which may detract from DOI or overall appearance. With each coating method, solvent addition may be necessary to adjust viscosity for best coating by that method. The coating is applied to layer A carried on a carrier web, advanced into a drying oven for removal of the solvent and then into a laminating nip to be bonded to layer C. If layer A is made with a removable carrier, the carrier may be removed and the film finish processed for the next manufacturing step.

Alternatively, the base coat/adhesive may be coated onto layer C, dried and nipped to layer A. In this instance, layer C must have sufficient resistance to withstand the solvents used and the heat of the drying process. A further option is to coat layer B onto a smooth silicone coated polyester release liner followed by drying and nip bonding to either layer A or B. Subsequently, the release liner may be removed and the two-layer composite nipped to the third major layer.

In one embodiment, layer B is coated in layers in one step, for example by laminar or cascade coating, or sequential application of layers. In this manner, one stratum may be more highly pigmented while the second stratum may be lightly or not pigmented in the interest of bond or lightly or differently pigmented in the interest of appearance performance. Light pigmentation can improve transparency for the deep wet look. Different pigmentation extends the range of color/appearance design options. Layered coating in the fashion described herein is considered as options for making major layer B.

The elongation typical for pressure-sensitive adhesives enhances the forming and shaping of the film finish composite in subsequent fabrication and application steps.

Layer C: Support Layer

The support layer serves two primary functions. First it gives the film finish a measure of bulk and stiffness for ease of handling in subsequent operations. The second function is the ability to bond the film finish to certain substrate materials. The support/bond layer may range in thickness from about 0.0003 inch up to about 0.050 inch. The basis for this wide range will become apparent in the following discussion.

The bonding function is predominate in thin support layers while the structure property has more weight in thick support layers. Bonding and structure are more nearly equal in intermediate thickness supports.

One option that has little structure property is to coat a dry thermoplastic material in a thickness range of 0.0003 to 0.001 inches onto a releasable carrier followed by transfer of the thermoplastic to the second surface of layer B. In this embodiment, the film finish acts essentially as a two layer composite with a "dry" back side that can be bonded to metal coil by known metal laminating processes. Alternatively, this construction can be fed into combining rolls against the hot extrudate of a profile or sheet extruder to produce surfaced sheet or profiles. Thermoplastic resins suitable for the dry coating are polymethylmethacrylate (PMMA) and its co-polymers. A specific material is Elvacite 2009 from ICI. Dry film adhesive made from Bostick's 4117 polyester resin is another candidate. A third candidate is extrusion coated Hytrel® 4056 from DuPont. Other dry coated polymers may be used provided they will bond to layer B and provide a bonding function to a substrate.

In general, the support layer thickness is made as thin as possible for economy while retaining sufficient thickness for the forming and bonding steps and to hide fiber or filler if present in the substrate. Thick support layers may provide sufficient strength when thermoformed or compression formed to yield parts that do not require further support from a substrate material.

Film and sheet candidates for layer C may be selected from the following representative materials: polybutyleneterephthalate (PBT), thermoplastic olefins (TPO), polypropylene (PP), polyethylene terephthalate (PET), polycarbonates (PC), PC/ABS, styrene/acrylonitrile (SAN) acrylics, thermoplastic urethanes (TPU), PC/PBT, and polyvinyl chloride (PVC). Naturally, blends and other similar materials may be used. Adhesion of layer C to layer B is typically improved by corona treating layer C as practiced routinely in the film industry. Other treatments such as flame or thin primers may also be used.

In one process, the film finish composite is thermoformed, trimmed and placed in an injection mold for injection bonding to a selected substrate. In a second process, the film finish is placed free standing in an open mold cavity, the mold closed and plastic injected. This process is limited to relatively thin parts. In a further process, the film finish is secured to the periphery of a mold cavity and, with combinations of heat, pressure and vacuum, formed into the mold cavity after which plastic is injected. The injected plastic in each instance may be unfilled or filled thermoplastic resin or in certain instances low pressure molding compound (LPMC) thermoset resin. Additionally, the process may be reaction injection molding (RIM). In each instance, the support layer C is selected to optimally bond to the substrate selected for the specific part. The freedom to select the substrate based on design and cost factors and yet surface the part with a specific film finish appearance is a direct result of the ability of the pressure-sensitive adhesive to bond to diverse surfaces required for bonding to diverse substrates.

FIG. 1 shows the construction of layers A, B and C, described above

Minor Surfaces

The minor layers play supporting roles to the performance of the major layers. Layer d for example may be a thin coating applied to improve abrasion and mar resistance. Layer d may be applied to the casting carrier web prior to casting major layer A in which layer d is directly incorporated into the A surface. Alternatively, layer d may be post applied to layer A after the film finish is fabricated or after the final part is formed. A candidate for layer d is a thin, <0.001 inch layer of a hard acrylic polymer. Alternatively, layer d may be a silicone material to add a measure of slip or lubricity to the finish surface.

Graphic enhancement can be incorporated into a film finish by printing minor layer e in designed patterns. Layer e may be printed by gravure, flexo, rotary screen or other methods used to apply designed or random patterns. Layer e may be applied in multiple applications with different colors to yield prescribed designs such as a woodgrain. The print may be applied in distortion such that the desired design is only observed after being formed into the final shape. In each design, major pigmented layer B provides an opacifying base color. The resin chemistry for the ink will be selected so as to achieve adhesion to layer A. Acrylic inks are preferred for the PVDF/acrylic clear coats.

Minor layer f may be a pigmented layer which is surface coating for layer C which results in a desired visual affect for the overall finish appearance. The chemistry of layer f will be selected to achieve adequate bond to layer C.

Minor layer g may be a pressure-sensitive adhesive for bonding a formed shape to a structure or a thermoplastic dry adhesive for heat bonding to a sub layer.

Figure 2:
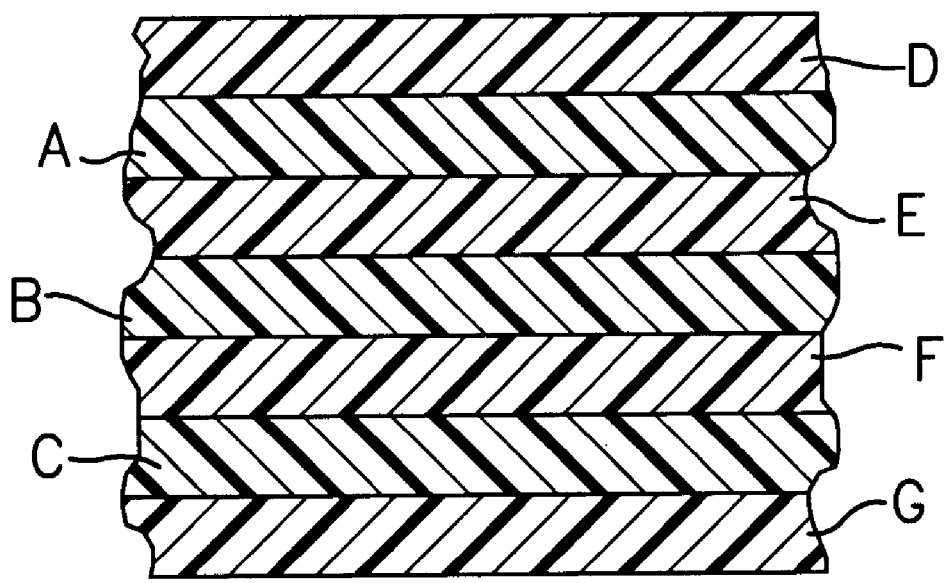
FIG. 2 is a schematic view of a further embodiment of the construction of the present invention.

FIG. 2 shows the construction of layers d/A/e/B/f/C/g, described above.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A paint film, which comprises:
    a clear coat layer of a sheet of polymer, said sheet having chemical resistance, weatherability and optical clarity, said sheet having an outer surface and an opposed bonding surface;
    a color layer adhered to said bonding surface, said color layer including incorporated therein a pressure sensitive adhesive admixed with at least one colorant to provide a pigmented, pressure sensitive adhesive; and
    a support layer of an extruded film adhered to said color layer.
2. A paint film according to claim 1, wherein the clear coat is a polyvinylidenefluoride polymer or copolymer.
3. A paint film according to claim 1, wherein the color layer is a pigmented acrylic pressure sensitive adhesive.
4. A paint film according to claim 1, wherein the support layer is an extruded film of a thermoplastic olefin.
5. A paint film according to claim 1, wherein the support layer is selected from the group consisting of: acrylonitrile/butadiene/styrene; polycarbonate/polybutyleneterephthalate blend; and styrene/acrylonitrile blend.
6. A paint film according to claim 1, for surfacing an automobile body part.
7. A paint film according to claim 1, wherein the clear coat is an extruded sheet of at least 0.0005 inch.
8. A paint film according to claim 1, wherein the clear coat is a film selected from the group consisting of polyvinyl fluoride, acrylic polymer, polyethylene terephthalate, polycarbonate, polyvinyl chloride, polyvinylidenefluoride, and polyvinylidenefluoride/acrylic blend.
9. A paint film according to claim 1, wherein the color layer has a thickness of from 0.0008 to 0.005 inch.
10. A paint film according to claim 9, wherein the clear coat has a thickness of from 0.0005 to 0.01 inch.
11. A paint film according to claim 10, wherein the support layer-color layer combination has a thickness of from 0.0003 to 0.050 inch.
12. A paint film according to claim 1, including a further layer bonded to the outer surface of the clear coat to improve abrasion and mar resistance.
13. A paint film according to claim 1, including a patterned layer between the clear coat and color layer.
14. A paint film according to claim 1, including a pigmented layer between the color layer and support layer.
15. A paint film according to claim 1, including a pressure sensitive adhesive bonded to an outside surface of the support layer.
16. A paint film according to claim 1, wherein the colorant is selected from the group consisting of color pigments, dies and flakes.
17. A paint film according to claim 12, wherein said further layer is a hard, acrylic polymer less than 0.001 inch thick.
18. A paint film according to claim 12, including a patterned layer between the clear coat and color layer.
19. A paint film according to claim 18, including a pigmented layer between the color layer and support layer.
20. A paint film according to claim 19, including a pressure sensitive adhesive bonded to an outside surface of the support layer.
21. A paint film according to claim 1, wherein the clear coat is an outer layer, the support layer is an inner layer, and the color coat is an intermediate layer between the clear coat and support layer.
22. A paint film according to claim 1, wherein the adhesive is water clear and self cross-linking.

* * * * *